US009200646B2

(12) United States Patent
Weickert et al.

(10) Patent No.: US 9,200,646 B2

(45) Date of Patent: Dec. 1, 2015

(54) CONTROL ARRANGEMENT AND METHOD FOR ACTIVATING A PLURALITY OF HYDRAULIC CONSUMERS

(75) Inventors: Thomas Weickert, Hessdorf (DE); Uwe Neumann, Rochester Hills, MI (US); Jan Amrhein, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 756 days.

(21) Appl. No.: 13/539,008

(22) Filed: Jun. 29, 2012

(65) Prior Publication Data

US 2013/0167518 A1 Jul. 4, 2013

(30) Foreign Application Priority Data

Jul. 1, 2011 (DE) ........................ 10 2011 106 307

(51) Int. Cl.

| | |
|---|---|
| ***F16D 31/02*** | (2006.01) |
| ***F15B 11/16*** | (2006.01) |
| ***E02F 9/22*** | (2006.01) |
| ***F04B 13/00*** | (2006.01) |

(52) U.S. Cl.

CPC ............. *F15B 11/163* (2013.01); *E02F 9/2228* (2013.01); *E02F 9/2235* (2013.01); *E02F 9/2296* (2013.01); *F04B 13/00* (2013.01); *F15B 11/162* (2013.01); *F15B 2211/20546* (2013.01); *F15B 2211/3054* (2013.01); *F15B 2211/634* (2013.01); *F15B 2211/6346* (2013.01); *F15B 2211/65* (2013.01); *F15B 2211/7052* (2013.01)

(58) Field of Classification Search

CPC ..... F15B 11/162; F15B 11/163; F15B 11/165

USPC ....................................... 60/422, 446; 91/516

See application file for complete search history.

(56) References Cited

U.S. PATENT DOCUMENTS

| | | | | |
|---|---|---|---|---|
| 4,870,819 A * | 10/1989 | Walzer | | 60/422 |
| 5,289,679 A * | 3/1994 | Yasuda | | 60/422 |
| 6,644,025 B1 * | 11/2003 | Oberhausser et al. | | 60/422 |
| 7,434,393 B2 * | 10/2008 | Hesse | | 60/422 |
| 2002/0011013 A1 | 1/2002 | Sawada et al. | | |
| 2007/0125078 A1 | 6/2007 | Tanaka et al. | | |

FOREIGN PATENT DOCUMENTS

| | | | |
|---|---|---|---|
| DE | 34 19 434 | A1 | 11/1984 |
| DE | 199 04 616 | A1 | 8/2000 |
| DE | 103 42 037 | A1 | 4/2005 |
| DE | 10 2005 033 222 | A1 | 1/2007 |
| DE | 10 2007 013 516 | A1 | 9/2008 |
| DE | 10 2007 019 787 | A1 | 10/2008 |
| DE | 10 2007 029 358 | A1 | 1/2009 |
| DE | 10 2008 038 793 | A1 | 10/2009 |
| WO | 2009/114407 | A1 | 9/2009 |

* cited by examiner

*Primary Examiner* — Michael Leslie

(74) *Attorney, Agent, or Firm* — Maginot, Moore & Beck LLP

(57) ABSTRACT

A control arrangement for supplying pressure medium to a plurality of consumers. A supply metering orifice and an individual pressure compensator are associated with each consumer of the plurality of consumers. The individual pressure compensator is adjusted via a central control unit.

16 Claims, 2 Drawing Sheets

CONTROL ARRANGEMENT AND METHOD FOR ACTIVATING A PLURALITY OF HYDRAULIC CONSUMERS

This application claims priority under 35 U.S.C. §119 to patent application no. DE 10 2011 106 307.6, filed on Jul. 1, 2011 in Germany, the disclosure of which is incorporated herein by reference in its entirety.

The present disclosure relates to a hydraulic control arrangement and to a method for activating a plurality of hydraulic consumers.

BACKGROUND

As set forth in DE 103 42 037 A1, hydraulic systems in which a plurality of consumers are supplied with pressure medium via a variable displacement pump are used, especially in mobile hydraulics, to activate these consumers. A metering orifice and a pressure compensator are provided between the variable displacement pump and each consumer, it being possible for the pressure compensator to be connected upstream or downstream of the metering orifice. In this case a distinction is made between LS (load sensing) systems operating on the flow regulation principle and systems operating on the flow distribution principle. In the latter, the pressure compensator is connected downstream of the metering orifice. These flow distribution systems are also referred to as LUDV (load-independent flow distribution) systems, which form a subgroup of the LS systems, in which the highest load pressure of the hydraulic consumers is communicated to a pump which is controlled in such a way that a pump pressure higher by a predetermined pressure difference than the highest load pressure is applied in the pump line. In an LUDV control arrangement, as described, for example, in DE 10 2005 033 222 A1, the pressure medium volume flow to the respective consumer is set by means of adjustable supply metering orifices each having an associated individual pressure compensator, by means of which the pressure drop across the respective supply metering orifice can be maintained constant.

In the LUDV control system the individual pressure compensators are arranged downstream of the metering orifices and in each case throttle the pressure medium volume flow between the metering orifice and the load by an amount such that the pressure to all metering orifices is equal, preferably equal to or slightly above the highest load pressure. The pump pressure is applied equally upstream of all the metering orifices, so that the pressure difference changes in the same way at all the metering orifices if the pump pressure decreases in the event of undersupply. In this case the distribution of the pressure medium volume flow (flow distribution principle) between the supply metering orifices of the activated consumers is maintained.

In the aforedescribed LS/LUDV architectures, the variable displacement pump is activated in dependence on the highest load pressure tapped via an LS line in such a way that a pressure higher than the highest load pressure by a pressure difference equivalent to the force of a control spring of a pump regulating valve is established in the pump line.

In DE 103 42 037 A1 a so-called EFM (Electronic Flow Matching) architecture is explained, whereby actuation signals are output to a pump regulating valve of the variable displacement pump as a function of reference values predefined, for example, by means of a joystick, in order to adjust the pressure medium volume flow.

A problem with such architectures implemented in mobile hydraulics is that the valves present for controlling the pressure medium volume flows are usually combined in one control block which is housed, in an excavator for example, in the region of the revolving superstructure. The pressure medium connection to the respective consumer is effected via at least one supply and return line per consumer. These lines, together with the corresponding brackets and screw connections, represent a considerable proportion of the total system costs.

In contrast, it is the object of the disclosure to reduce the equipment-related outlay for implementing a hydraulic control arrangement, and to provide a simplified method for activating a plurality of consumers.

This object is achieved, with regard to the control arrangement and the method described herein.

SUMMARY

According to the disclosure, the hydraulic control arrangement for supplying pressure medium to a plurality of consumers is implemented with a variable displacement pump by means of which pressure medium can be delivered to each consumer via an adjustable supply metering orifice and an individual pressure compensator associated therewith. The individual pressure compensators are subjected in the opening direction to the pressure downstream of the respective supply metering orifice. According to the disclosure a control pressure which is adjustable via a central control unit acts in the closing direction of each individual pressure compensator.

The solution according to the disclosure is therefore provided by a conventional LUDV architecture, in such a way that the respective individual pressure compensators are no longer subjected in the closing direction to the highest load pressure of the consumers, but to a control pressure adjusted via a control unit. It is therefore no longer necessary to tap the LS pressure at the respective consumers and to supply it to the individual pressure compensators via a common LS channel in the control block. It is therefore possible to divide the control block into individual valve disks which can be arranged in a decentralized manner on or near the consumers. The decentralized arrangement has the advantage that the consumers can be supplied via a common high and low pressure line. As compared to a conventional LUDV architecture with a central control block, in which each consumer has to be supplied via at least one separate high pressure line, this represents a considerable saving of hydraulic lines. In addition, because it is no longer necessary to tap the LS pressure at the consumers, conventional LS lines can be dispensed with. Furthermore, it is no longer necessary to determine the highest LS pressures by means of a shuttle valve cascade.

In this way the equipment-related outlay can be considerably reduced as compared to conventional LUDV architectures.

Although a decentralized LUDV architecture would in principle be possible on the basis of the tapped LS pressures of the consumers, in that case the shuttle valve cascade would have to be distributed to the individual consumers, entailing a considerable equipment-related outlay. In order to avoid this expenditure, the determination of the highest load pressure could alternatively be effected in known fashion by means of electronic pressure sensors. However, these sensors would need to have high accuracy and would therefore be very expensive.

In a preferred exemplary embodiment of the disclosure, the control pressures acting on the individual pressure compensators in the closing direction are equal, so that the equipment-related and control system-related outlay is further reduced. Through the operation of the individual pressure compensators, the same pressure is produced in each case downstream of the supply metering orifices as a result of equal control pressures. This equal pressure is at least equal to, or greater than, the control pressure. Because the pump pressure is applied upstream of each supply metering orifice, the pressure drop at each supply metering orifice is therefore equally great, whereby load-independent flow distribution (LUDV) is produced.

Opening cross sections and lift amounts corresponding thereto are established in known fashion at the individual pressure compensators as a function of the pressure drop across the respective pressure compensator. A change of the load pressures or a change of the pressure downstream of the supply metering orifices therefore leads to a movement of the individual pressure compensators concerned and therefore to changed opening cross sections. The lift of the individual pressure compensator is therefore a measure for the load pressure associated with it. If the individual pressure compensators are subjected to the same control pressure, therefore, their load pressures can be compared to one another in an especially simple and advantageous manner by comparing the lifts of the individual pressure compensators. In this case the individual pressure compensator of the consumer with the highest load pressure has the largest opening cross section and the corresponding lift, and can therefore be identified thereby. In an especially preferred exemplary embodiment, the control pressure is adjusted in such a way that this individual pressure compensator is set to a reference opening position below its maximum opening cross section, and the individual pressure compensators of the consumers with lower loads are set to a smaller opening cross section. In this way it is prevented that the individual pressure compensator associated with the consumer having the highest load pressure is fully opened, and that a control function is therefore no longer possible. In this case it may also be necessary to adapt the delivery rate of the pump correspondingly via the control unit.

The control arrangement according to the disclosure can be implemented especially simply if the adjustment of the control pressure is effected via pressure reducing valves by means of which the pressure established by the variable displacement pump upstream of the supply metering orifices can be reduced to a predetermined control pressure. As a result, the pressure drop across the supply metering orifices can be directly predetermined via the control unit and via the pressure reducing valves activated thereby. In this case the pressure drop across the supply metering orifices is greater the lower the control pressure, or the more strongly the pressure established by the variable displacement pump is throttled by the pressure reducing valves.

In this case it is especially preferred if the pressure reducing valves are adjustable electrically or electrohydraulically via the control unit. Thus, for example by increasing a magnetic force of an electromechanically actuated pressure reducing valve, the pressure drop across the pressure reducing valve, or across the associated supply metering orifice, can be increased.

In an especially preferred and advantageous development of the hydraulic control arrangement, the adjustment of the control pressure is effected as a function of the lift of the individual pressure compensator associated with the consumer having the highest load pressure. In this case—as explained above—the control pressure is set in such a way that the lift or, in other words, the opening cross section of the individual pressure compensator, does not reach its maximum value but lies slightly below it. At this point the advantage of the solution according to the disclosure becomes especially clear: instead of conventionally determining the highest load pressure by means of LS lines and a shuttle valve cascade entailing high equipment-related outlay, or expensive pressure sensors, the necessary control pressure is set via the control unit as a function of the lift of the individual pressure compensator having the largest opening cross section, which can be determined more simply in terms of equipment.

The control pressure is adjusted preferably as a function of the lift of the individual pressure compensator associated with the consumer having the highest load pressure.

In order to determine the lift, the individual pressure compensators may be configured with a displacement transducer, which is cost-effective in comparison to the conventional means for determining load pressure which have been discussed.

In the event that the control arrangement is configured with priority consumers, these may be excluded from the activation concept according to the disclosure, the control pressure being adjusted in the case of the individual pressure compensators associated with these priority consumers in such a way that the pressure difference across the associated supply metering orifice remains substantially constant even in the event of undersupply, so that a sufficient supply of pressure medium to the priority consumer is ensured.

In a preferred exemplary embodiment, the control arrangement is implemented as a decentralized system in which the individual pressure compensators, the pressure reducing valves and the supply metering orifices are arranged locally in the region of the respective consumer. In this way the equipment-related outplay for piping—as explained in the introduction—can be considerably reduced.

The variable displacement pump is preferably implemented with an electroproportional swivel angle control system, so that the pump is adjustable in dependence on a signal of a control device, for example a joystick, thus eliminating the need to tap the highest load pressure of the consumers and conduct it to the pump controller.

The control arrangement according to the disclosure can be implemented especially advantageously in mobile hydraulics, for example in working cylinders of mobile equipment such as an excavator.

A method according to the disclosure is used to activate a plurality of hydraulic consumers each of which is connected via pressure medium to a variable displacement pump via an individual pressure compensator and a supply metering orifice. In this case the individual pressure compensators are subjected in the opening direction to a pressure downstream of the associated supply metering orifices and in the closing direction to a control pressure. According to the disclosure the control pressure is in this case adjusted via a control unit.

The method according to the disclosure therefore departs from the conventional utilization of an LS pressure for an LUDV method. In contrast to the prior art, the “substitution” according to the disclosure of the LS pressure, which is complex and costly to determine, by a suitably adjustable control pressure opens the possibility of creating control arrangements for considerably less equipment-related outlay. Thus, the substitution eliminates the need for LS lines and a cascade of shuttle valves in order to determine a highest of the LS pressures. In particular, the omission of the shuttle valve cascade advantageously makes possible a division of a conventional central control block into individual locally arranged valve disks which can be located on or close to the consumers. As a result of the decentralized arrangement, the consumers can be supplied in succession via a common high and low pressure line. If, by contrast, a conventional LS-pressure based LUDV method with a central control block is used, each consumer must be supplied via a separate high pressure line. Although locally arranged valve disks would also be possible with the use of a conventional LS-pressure based method, the shuttle valve cascade would then have to be distributed spatially to the individual consumers, entailing a considerable outlay in terms of piping. Alternatively, in order to avoid this expense, the highest load pressure might be determined in known fashion with the aid of electronic pressure sensors of high accuracy. These are, however, very expensive.

Opening cross sections, or corresponding lifts, are established at the individual pressure compensators in known fashion as a function of the pressure drop across the respective pressure compensator. A change in the load pressure situation or a change in the pressure downstream of the supply metering orifices therefore leads to a movement of the individual pressure compensator affected by the change, and therefore to a change in the cross section thereof. The control pressures to which the individual pressure compensators are subjected are preferably equal, so that the opening cross sections, as a measure for the load pressures of the individual pressure compensators, can be compared with one another in an especially simple and advantageous manner. On the basis of this interrelationship a suitable value for the control pressure can be set via the control unit, preferably in dependence on the opening cross sections or lifts of the individual pressure compensators. For this purpose the method according to the disclosure preferably includes, prior to the setting of the control pressure, a step: "Determining opening cross sections of the individual pressure compensators".

In this case the individual pressure compensator of the consumer having the highest load pressure has the largest opening cross section, and the corresponding lift, and can therefore also be identified thereby. The setting of the control pressure via the control unit is then effected especially preferably in dependence on the individual pressure compensator which has the largest of the opening cross sections or the lift corresponding thereto. For this purpose the method according to the disclosure preferably includes a step "Determining a largest of the opening cross sections".

It is thereby ensured that all of the individual pressure compensators—in particular the one opened furthest—are always in a control position in which their opening cross sections can be further increased by changed load pressure conditions, provided the largest of the opening cross sections, or the lift corresponding thereto, is adjusted via the control unit to a reference value which is preferably smaller than a maximum possible opening cross section of the individual pressure compensator concerned. In this case it may also be necessary to adapt the delivery rate of the pump accordingly via the control unit. For this purpose the method according to the disclosure preferably includes a step "Determining a deviation of the largest of the opening cross sections from a reference value". The step "Adjusting the control pressure via the control unit" is then performed in dependence on the deviation from the reference value which has been determined.

In this case, the step "Determining opening cross sections of the individual pressure compensators" is performed especially simply and advantageously in terms of equipment by determining lifts of the individual pressure compensators via displacement transducers.

In this case the step "Adjusting the control pressure via the control unit" is preferably performed by means of pressure reducing valves activated by the control unit. These pressure reducing valves throttle down to the control pressure a pump pressure built up by the pump. The activation is preferably performed equally for all the pressure reducing valves and in such a way that the opening cross section of the individual pressure compensator which is opened furthest is adjusted to the reference value.

In the method according to the disclosure for activating a plurality of hydraulic consumers, the individual pressure compensator of the consumers is in each case adjusted—as explained—via the central control unit, the control pressure being set in such a way that the individual pressure compensator associated with the consumer having the highest load pressure is set to an opening cross section which is below the maximum opening cross section. As explained, with the method according to the disclosure priority consumers can be excluded from the control concept in that the control pressure of these priority consumers is selected such that a predetermined pressure difference at the associated supply metering orifice, and therefore a sufficient pressure medium supply, is always ensured.

BRIEF DESCRIPTION OF THE DRAWINGS

A preferred exemplary embodiment of the disclosure is explained in more detail below with reference to schematic drawings, in which.

DETAILED DESCRIPTION

Figure 1:
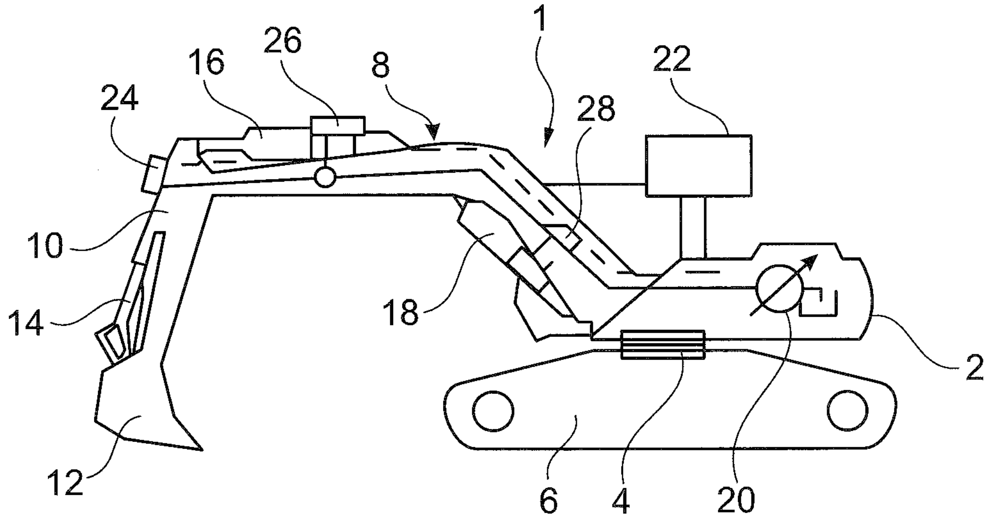
FIG. 1 is a highly schematized view of a piece of mobile equipment.

FIG. 1 is a highly schematized basic representation of a piece of mobile equipment, in the present case an excavator 1, the superstructure 2 of which is mounted rotatably via a slewing gear 4 on a chassis 6. The superstructure 2 carries a boom 8 to which a strut 10 having a shovel 12 is articulated. The excavator 1 has a hydraulic propulsion drive by which the slewing gear 4 is also actuated hydraulically. Actuation of the shovel 12, the strut 10 and the boom 8 is effected by a respective hydraulic cylinder 14, 16, 18. The pressure medium supply to the hydraulic consumers is effected via a variable displacement pump 20 and a control valve arrangement which is explained in more detail below. The activation of the variable displacement pump 20 and of some of the control valves of the control valve arrangement is effected via a central control unit 22 which, in the representation according to FIG. 1, is drawn externally for clarity but is integrated in the superstructure or the like. A particular feature of the exemplary embodiment described is that the control valve arrangements 24, 26, 28 associated with each consumer are not arranged in a control block but close to the respective hydraulic consumers, for example the hydraulic cylinders 14, 16, 18.

The basic concept of the control arrangement of the mobile equipment shown in FIG. 1 is explained with reference to FIG. 2. In this figure some consumers of the mobile equipment, for example the hydraulic cylinder 14 of the shovel 12 and the hydraulic cylinder 16 for actuating the strut 10 are represented by way of example. For simplicity, the working cylinder for the boom and the hydraulic motors of the chassis and of the stewing gear are not shown.

As explained, the pressure medium is supplied via the variable displacement pump 20, the delivery volume of which is set via a pump controller 30. This pump controller 30 makes possible, for example by means of an electroproportional swivel angle control system, a stepless and reproducible adjustment of the delivery volume of the pump. The operation of such a pump control system is explained, for example, in DE 10 2007 029 358 A1 cited in the introduction. The activation of the pump controller 30 is effected via the central control unit 22 which, in order to execute the control, is connected via a control signal line to the electrically or electrohydraulically adjustable pump controller 30. The control signal is predetermined by means of the input control devices 34, 36 which are adjusted in known fashion by means of joysticks 38, 40 by the vehicle operator, the joysticks 38, 40 being adjusted in the exemplary embodiment represented in order to actuate the shovel 12 and the strut 10. As shown in FIG. 2, the delivery flow rate Q of the pump is adjusted in such a way that the pressure medium demand set by the joysticks 38, 40 is fulfilled and the consumers are therefore actuated at the speed intended by the vehicle operator.

The variable displacement pump 20 draws pressure medium from a tank T and delivers it via its pressure connection P to a feed line 42 which branches to the consumers 14, 16. The pump pressure $p_p$ is applied in this feed line 42. A control valve arrangement 44, 46, of identical construction in each case, is arranged in each working line leading to the respective consumer 14, 16. In this respect the basic principle of the control valve arrangement 44, 46 corresponds to an LUDV architecture in which an individual pressure compensator 52, 54 is associated with a supply metering orifice 48, 50 in the form of an adjustable directional control valve or the like. The individual pressure compensators 52, 54 are in each case subjected in the opening direction to a pressure p* downstream of the respective supply metering orifice 48, 50, and in the closing direction to a control pressure in a control line 56, 58 which is connected to the outlet of a pressure reducing valve 60, 62 which, in the exemplary embodiment represented, is configured with a discharge opening to the tank T. In principle, a configuration without a discharge opening may also be selected.

An inlet connection of the pressure reducing valve 60, 62 is connected via a line 69, 70 to the feed line 42, so that the pressure acting at the inlet of the respective supply metering orifice 48, 50 is tapped via the pressure reducing valves 60, 62 and is reduced to the control pressure 56, 58 predetermined via the control unit 22. In the exemplary embodiment illustrated, the pressure reducing valves 60, 62 are adjusted electrically via a proportional magnet 64, 66 which is connected via a control signal line 68 to the central control unit 22, both proportional magnets 64, 66 being supplied, in the exemplary embodiment illustrated, with the same control signal in order to adjust the outlet pressure.

With conventional LUDV architectures, the highest load pressure in each case is applied in the control line 56, 58 and is then tapped by the consumers via a shuttle valve cascade.

With the solution according to the disclosure, the individual pressure compensators 52, 54 are configured with a respective displacement transducer 72, 74 by means of which the lift of the valve body of the individual pressure compensator 52, 54 can be detected. The control signals corresponding to the respective lift are output to the control unit 22 via signal lines 76, 78.

The supply metering orifices 48, 50 are likewise adjusted hydraulically or electrohydraulically, the opening cross section of the supply metering orifices 48, 50, and therefore the pressure medium volume flow to the respective hydraulic cylinder 14, 16, being adjusted via the control unit 22 and signal lines 49, 51.

Figure 2:
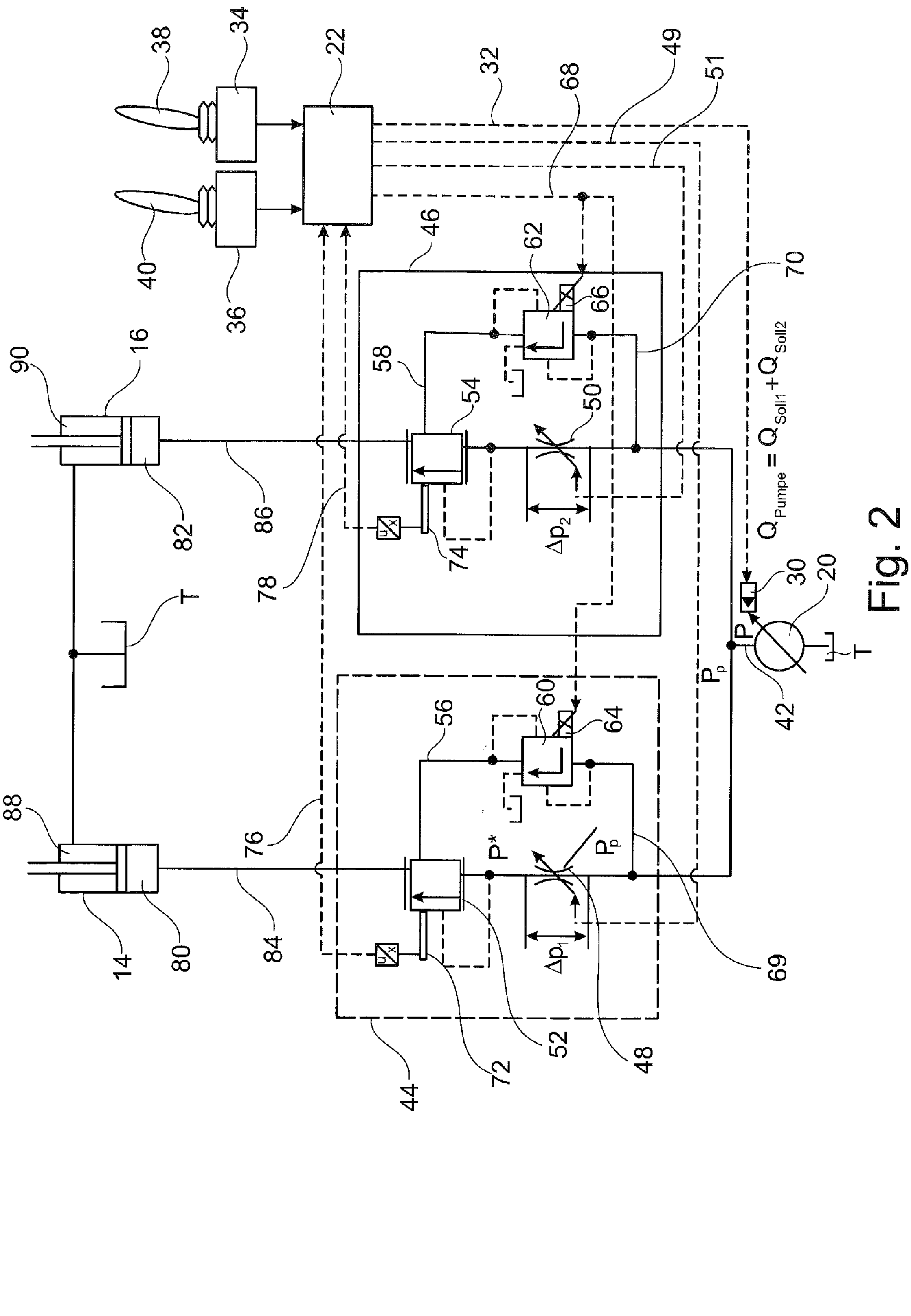
FIG. 2 shows a hydraulic control arrangement of the equipment according to FIG. 1.

As represented in FIG. 2, the two hydraulic cylinders (working cylinders) 14, 16 are in the form, in the highly simplified representation, of single-acting cylinders, a pressure chamber 80 acting in the extension direction being connected to a supply line 84, 86 which is connected to the outlet connection of the respective individual pressure compensator 52, 54. The rear annular chambers 88, 90 of the hydraulic cylinders 14, 16 are discharged to the tank T. In a real system, the cylinders would not be single-acting but double-acting.

In order to actuate the hydraulic consumers, the two joysticks 38, 40 (and optionally the control devices of the other consumers not shown) are actuated and an actuation signal which corresponds to the volume flow demand of the consumers 14, 16 set by means of the joysticks 38, 40 is input to the signal line 32 via the control unit 22 as a function of input-output maps stored therein. The swivel angle of the variable displacement pump 20 is then adjusted in a manner known per se via the pump controller 30 in order to cover the required pressure medium volume flow $Q_{Pumpe}$. To this extent the concept according to the disclosure corresponds to an EFM architecture.

In a corresponding way, the opening cross section of the supply metering orifices 48, 50 is adjusted in dependence on the control signal predetermined by the control unit 22.

As explained, with such an architecture the pressures p* downstream of the supply metering orifices 48, 50 are identical in each case, so that fluid can pass through both supply metering orifices 48, 50 independently of load pressure and the pressure medium volume flow depends only on the opening cross section. The control pressure in the control lines 56, 58 is adjusted via the respective pressure reducing valves 60, 62 in such a way that the individual pressure compensator of the consumer with the highest load pressure, for example the individual pressure compensator 54 of the hydraulic cylinder 16, does not reach its lift stop and is therefore fully open. In such a case the control function of this individual pressure compensator 54 would be disabled. In the present case, the lift of the individual pressure compensators 52, 54 is monitored via the displacement transducers 72, 74 and the control pressure acting on the associated individual pressure compensator 54 is adjusted by appropriate activation of the pressure reducing valve 62 with the highest load pressure in such a way that the individual pressure compensator 54 is not set to its maximum opening position. In a corresponding way, the lift of the individual pressure compensators having the lower load, in the present case the individual pressure compensator 52, is adjusted to a smaller lift, since the pressure p* is throttled down via this individual pressure compensator 52 to the load pressure in the pressure chamber 80, which is below the higher load pressure in the pressure chamber 82 of the hydraulic cylinder 16 with the higher load pressure. That is to say that the lift of the individual pressure compensator 52 is smaller than that of the pressure compensator 54 which has the highest load pressure. It is thereby ensured that the individual pressure compensators of all the activated consumers can be set to their control position, so that an activation of the consumers corresponding to an LUDV architecture is possible. As explained, in the case of undersaturation the pressure medium volume flow would be proportionally reduced as a function of the opening cross sections set at the supply metering orifices, so that the consumers are extended at lower speed than would be the case with a sufficient pressure medium supply.

According to the disclosure, the opening lift of the individual pressure compensator 54 having the highest load pressure is selected as large as possible, so that this individual pressure compensator 54 opens as far as possible but does not reach the lift stop, and the throttling losses of the pressure compensator having the highest load pressure are correspondingly minimized.

Figure 3:
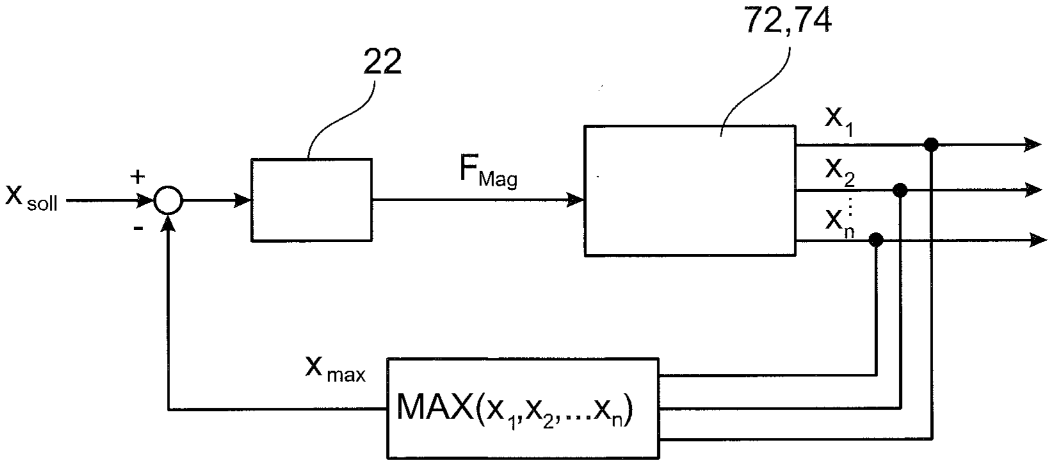
FIG. 3 is a diagram of a control circuit of the control arrangement according to FIG. 2.

FIG. 3 shows the control circuit which is established by the concept according to the disclosure.

An adjustment signal is output to the proportional magnets 64, 66 of the pressure reducing valves 60, 62 via the control unit 22 acting as a controller. This control signal corresponds to a predetermined magnetic force $F_{Mag}$. Accordingly, the pump pressure $p_p$ is then reduced via the respective pressure reducing valves 60, 62 to a control pressure in the control line 56, 58 and the associated individual pressure compensator 52, 54 is adjusted. The lift x of the individual pressure compensators is then detected via the displacement transducers 72, 74 and the maximum lift value $x_{Max}$ of the activated individual pressure compensators 52, 54 is then determined from a comparator device. This maximum value is compared to a reference lift $x_{soll}$ stored in the memory of the control unit 22 and a signal is output via the control unit 22 if the lift $x_{Max}$ of the furthest-open individual pressure compensator 54 is greater than the reference value. In this case the control function of the furthest-open individual pressure compensator is no longer ensured. In a corresponding manner, a signal is then output to the pressure reducing valves 60, 62 via the control unit 22 in order to increase the pressure in the control line 56, 58 and therefore to adjust the individual pressure compensator 54 having the highest load pressure in the closing direction until the reference lift $x_{soll}$ is reached.

In this way, with minimum piping-related outlay, the LUDV function of the control arrangement can continue to be ensured, while the EFM architecture ensures that the response behavior of the system is improved by the practically simultaneous activation of variable displacement pump 20 and supply metering orifices 48, 50.

A control arrangement for activating a plurality of hydraulic consumers and a method for activating the consumers are disclosed, a supply metering orifice and an individual pressure compensator being associated with each consumer. Said individual pressure compensator is subjected in the closing direction to a control pressure which is adjustable via a control unit.

What is claimed is:

1. A hydraulic control arrangement for supplying a pressure medium to a plurality of consumers, comprising:

a variable displacement pump connected via the pressure medium to the plurality of consumers in each case via an adjustable supply metering orifice and an individual pressure compensator associated therewith, wherein the individual pressure compensators are subjected in the opening direction to the pressure downstream of the respective supply metering orifices and in the closing direction to a control pressure, wherein the control pressure is adjustable via a control unit, and wherein the control pressure for the individual pressure compensators is approximately equal.

2. A hydraulic control arrangement for supplying a pressure medium to a plurality of consumers, comprising:

a variable displacement pump connected via the pressure medium to the plurality of consumers in each case via an adjustable supply metering orifice and an individual pressure compensator associated therewith, wherein the individual pressure compensators are subjected in the opening direction to the pressure downstream of the respective supply metering orifices and in the closing direction to a control pressure, wherein the control pressure is adjustable via a control unit, and wherein the control pressure is adjusted in such a way that the individual pressure compensator of the consumer having the highest load pressure is set to a reference opening position and the individual pressure compensators of the consumers having lower load pressure are set to a smaller opening cross section.

3. The control arrangement according to claim 2, further comprising a pressure reducing valve configured to adjust the control pressure.

4. The control arrangement according to claim 3, wherein the pressure reducing valve is adjustable electrically or electrohydraulically via the control unit.

5. The control arrangement according to claim 3, wherein the individual pressure compensator, the supply metering orifice, and the pressure reducing valve are arranged locally in the region of the respective hydraulic consumer.

6. The control arrangement according to claim 2, wherein the control pressure is adjusted as a function of the lifts of the individual pressure compensators associated with the consumers.

7. The control arrangement according to claim 6, wherein the individual pressure compensator includes a displacement transducer.

8. The control arrangement according to claim 2, wherein the control pressure is adjusted as a function of the lift of the individual pressure compensator associated with the consumer having the highest load pressure.

9. The control arrangement according to claim 2, wherein at least the individual pressure compensator of a priority consumer is adjustable, by adjusting the control pressure, in such a way that the pressure difference across the associated supply metering orifice remains substantially constant.

10. The control arrangement according to claim 2, wherein the variable displacement pump is electroproportionally adjustable.

11. The control arrangement according to claim 2, wherein the individual pressure compensator and the supply metering orifice are arranged locally in the region of the respective hydraulic consumer.

12. The control arrangement according to claim 2, wherein a reference opening cross section is provided to be as close as possible to the maximum opening cross section.

13. The control arrangement according to claim 2, wherein the consumers are hydraulic cylinders of a piece of mobile equipment.

14. A method for activating a plurality of hydraulic consumers which are connected via pressure medium to a variable displacement pump via an individual pressure compensator and a supply metering orifice in each case, comprising:

subjecting the individual pressure compensators in the opening direction to a pressure downstream of the associated supply metering orifices;

subjecting the individual pressure compensators in the closing direction to a control pressure; and adjusting the control pressure via a control unit, wherein the adjusting the control pressure via the control unit is performed in dependence on opening cross sections of the individual pressure compensators.

15. The method according to claim 14, wherein the adjusting the control pressure via the control unit is performed in dependence on the individual pressure compensator which has a largest of the opening cross sections.

16. The method according to claim 15, wherein a reference value of the largest of the opening cross sections is smaller than a maximum opening cross section of the individual pressure compensator.

* * * * *